United States Patent Office 3,035,817
Patented May 22, 1962

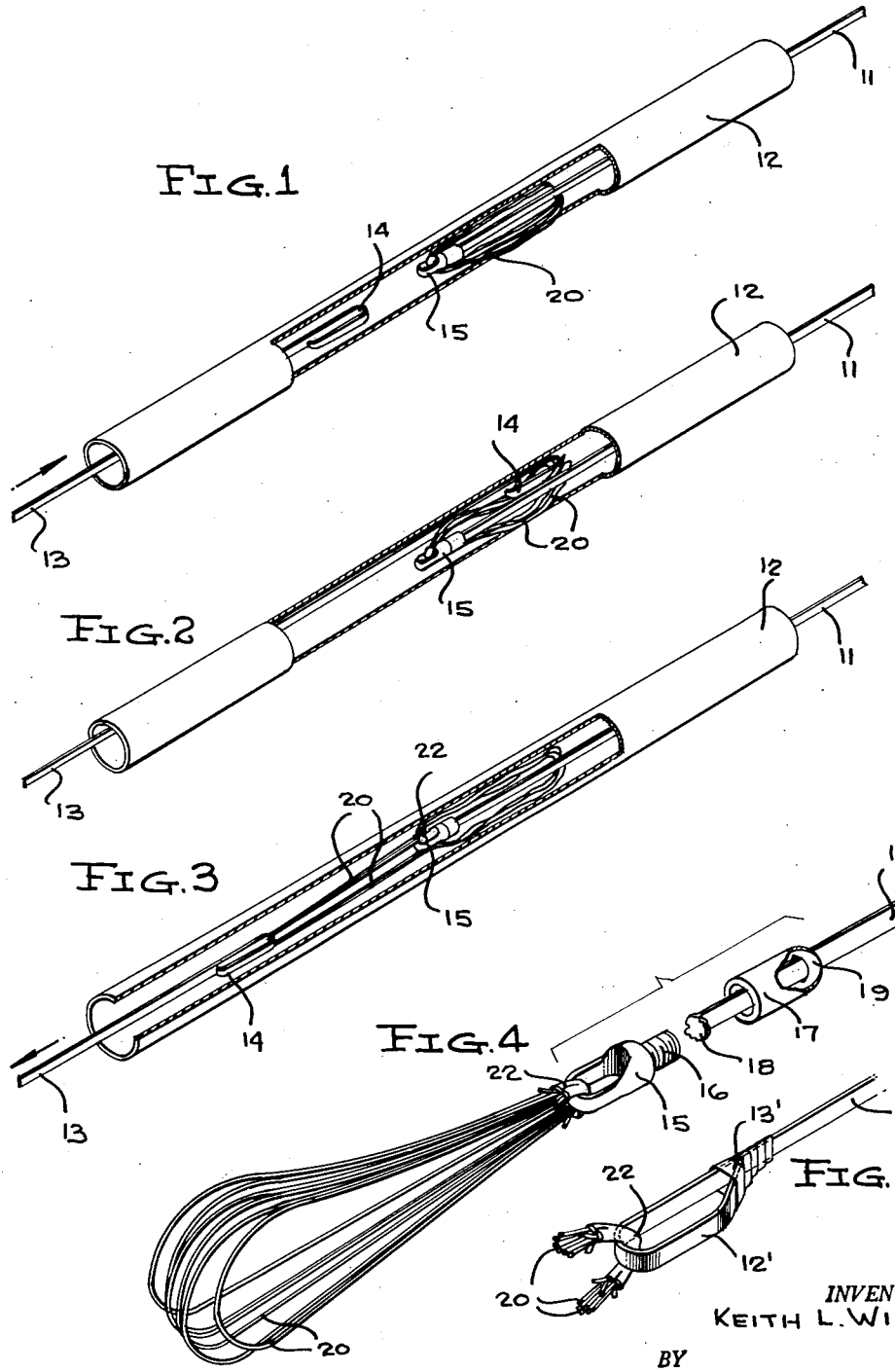

3,035,817
FISH TAPE SNAGGER
Keith L. Wilson, 822 Skyway Blvd.,
Colorado Springs, Colo.
Filed Mar. 29, 1960, Ser. No. 18,322
1 Claim. (Cl. 254—134.3)

This invention relates to devices for pulling electrical conductors through conduits, and more particularly to fish tape devices.

A main object of the invention is to provide a novel and improved fish tape which may be pulled through a relatively long conduit by inserting the fish tape through one end of the conduit and by inserting another fish tape through the opposite end of the conduit and engaging the first fish tape, the first fish tape being provided with means according to the present invention for facilitating the engagement of the second fish tape therewith.

A further object of the invention is to provide a novel and improved fish tape provided with specific means for enabling the fish tape to be snagged when it becomes jammed in a conduit and to facilitate pulling the fish tape through the conduit so that the fish tape may be employed for pulling electrical conductors through said conduit.

Further objects and advantages of the invention will become apparent from the following description and claims, and from the accompanying drawings, wherein:

FIGURE 1 is a perspective view of a conduit showing the manner in which an improved fish tape snagging device according to the present invention is employed to facilitate pulling a fish tape through the conduit, the conduit being broken away at its intermediate portion to show the cooperating elements.

FIGURE 2 is a perspective view similar to FIGURE 1 and showing the manner in which the hooked end of the auxiliary fish tape is engaged with the snagging device preliminary to pulling the original fish tape through the conduit.

FIGURE 3 is a perspective view showing the manner in which the auxiliary fish tape exerts tension on the resilient loops of the snagging device to pull the original fish tape through the conduit.

FIGURE 4 is an enlarged perspective view showing one form of snagging device according to the present invention with the parts thereof separated and illustrating the associated fish tape with which the snagging device is employed.

FIGURE 5 is a perspective view illustrating a modified form of attaching means for a fish tape snagging device according to the present invention.

Referring to the drawings, and more particularly to FIGURES 1 to 4, 11 designates a fish tape comprising an elongated flexible, ribbon-like member of sufficient stiffness to be pushed a substantial distance through a conduit, for example, an electrical conduit 12, preparatory to drawing insulated conductors through the conduit. In the case of relatively long conduits, difficulty is experienced in pushing fish tapes through the entire length of the conduit, and it is desirable to employ an auxiliary fish tape 13 which is inserted from the opposite end of the conduit and which is employed to hook onto the original fish tape so as to provide a means for pulling the original fish tape through the conduit in the original direction of its insertion. The auxiliary fish tape 13 is provided with the usual hook 14 on its end, which is relatively elongated, and which is therefore quite difficult to engage with the hooked end of the normal fish tape for carrying out the procedure above described.

In accordance with one embodiment of the present invention a snagging device is provided on the end of the original fish tape 11, the snagging device comprising a rigid eye member 15 which is provided with a threaded shank 16 which is threadedly engageable in a sleeve member 17 provided on the end of the fish tape 11. Thus, the sleeve member 17 is retained on the fish tape 11 by the provision of an enlarged end portion 18 on the end of the fish tape which is adapted to abut with the end wall of the sleeve member 17, the end wall being suitably inturned to provide an inwardly directed flange against which the enlarged end portion 18 can abut to retain the sleeve member 17 on the fish tape 11. The sleeve member 17 is internally threaded so that the stud 16 may be threadedly engaged therewith, and so that the rigid eye member 15 may be secured to the end of the fish tape 11 by tightly threading the stud member 16 in the sleeve 17.

In FIGURE 4, the rear end portion of the sleeve member 17 is partly broken away to show the inside surface of the inturned abutment flange, shown at 19, provided at the rear end of the sleeve member.

Designated at 20 are a plurality of elongated, closely adjacent closed loops of resilient wire or similar yieldable resilient material, which are engaged through and retained by the loop of the rigid eye member 15, the wirelike resilient loops 20 being bound together by a suitable retaining sleeve 22 which thus concentrates the strands of the resilient loops 20 and which is bent to a substantially U-shaped configuration so that it serves as the force transmitting means for coupling the rigid eye member 15 to the resilient loop members 20.

The sleeve member 22 may comprise a conventional sheet metal splicing sleeve connector which is crimped around the closely adjacent portions of the loop members 20. The loop members 20 may comprise piano wire or similar wire material.

In operation, the fish tape 11 is engaged through the conduit 12 as far as it will go, whereby the yieldable resilient wire-like members 20 are extended rearwardly of the rigid eye member 15 in the manner illustrated in FIGURE 1, being spread in a random manner behind the rigid eye member. When it is not possible to push the fish tape 11 any further through the conduit 12, the auxiliary fish tape 13 is inserted from the opposite end of the conduit, and the hooked end 14 thereof is pushed sufficiently into the conduit to move adjacent the free rear portions of the resilient wire loops 20 in the manner illustrated in FIGURE 2. The auxiliary fish tape 13 is pushed sufficiently into the conduit to assure that the hook-like end 14 thereof will engage in some of the resilient wire loop members 20 when the auxiliary fish tape 13 is pulled out of the conduit, in the manner illustrated in FIGURE 3. Thus, as shown in FIGURE 3, the hook-like portion 14 engages with some of the resilient wire loops 20, so that by exerting tension on the auxiliary fish tape 13, the original fish tape 11 may be pulled completely through the conduit.

FIGURE 5 illustrates another form of the invention, wherein the original fish tape, shown at 11', is formed at its end with a loop 12' which is reinforced by fastening the free end thereof to the main body of the fish tape 11' by means of suitable fastening tape 13', such as electricians' tape, or the like. This eliminates the necessity of employing the rigid eye loop 15 and retaining sleeve 17 described in the previous form of the invention, resulting in a somewhat more economical construction.

As in the previously described form of the invention, the resilient loop members 20 are engaged through the loop 12', and the crimped sleeve 22 fastens the resilient wire loop members 20 together and provides a bearing surface for transmitting force between the resilient wire members 20 and the loop 12', as is clearly illustrated in FIGURE 5.

The form of the invention shown in FIGURE 5 has several important advantages over the form shown in FIGURES 1 to 4, namely:

(a) It is much lower in cost since it does not require the use of the specially fabricated eye loop 15.

(b) The rigid eye member introduces a certain amount of resistance to the forward movement of the fish tape through the conduit; less resistance is present with the somewhat resilient eye loop 12' of FIGURE 5.

(c) It takes less time to attach the loop members 20 to the eye loop 12' of FIGURE 5 than by the use of the rigid eye loop 15 of FIGURES 1 to 4.

While certain specific embodiments of an improved fish tape snagging structure have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In combination, a fish tape comprising an elongated flexible ribbon-like member of sufficient stiffness to be pushed through a conduit, an eye member defining a loop on the end of said fish tape, a plurality of elongated loops of resilient wire-like material, and a sleeve member engaged around portions of said last-named loops and holding said portions bound together in closely adjacent relationship, said sleeve member and said last-named loops being pivotally engaged through said eye member and said eye member being transversely engaged with said sleeve member, the resilient loops of wire-like material being yieldable sufficiently to be pushed through a conduit with the fish tape in one direction and being extendable rearwardly of the first-named loop as said first-named loop is pushed through the conduit, said resilient loops being engageable by the hooked end of another fish tape pushed through the conduit from the opposite direction.

References Cited in the file of this patent

UNITED STATES PATENTS

| | | |
|---|---|---|
| 1,130,775 | Toffey | Mar. 9, 1915 |
| 1,658,887 | Dotzauer | Feb. 14, 1928 |